(Model.) 2 Sheets—Sheet 1.
R. W. MASKE.
CORD HOLDER FOR GRAIN BINDERS.
No. 297,144. Patented Apr. 22, 1884.
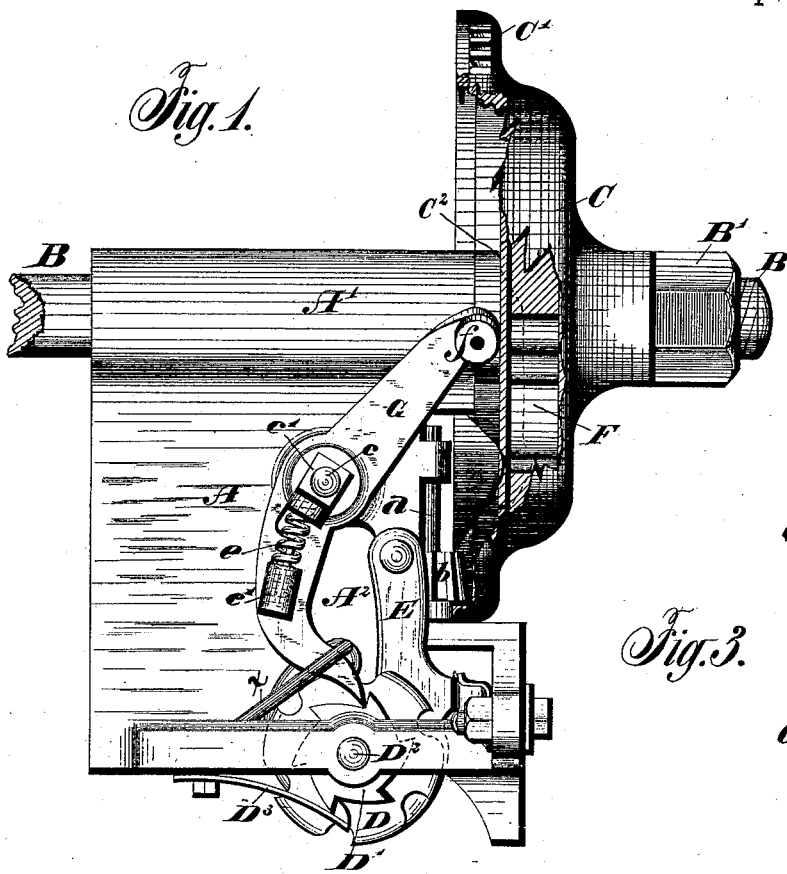
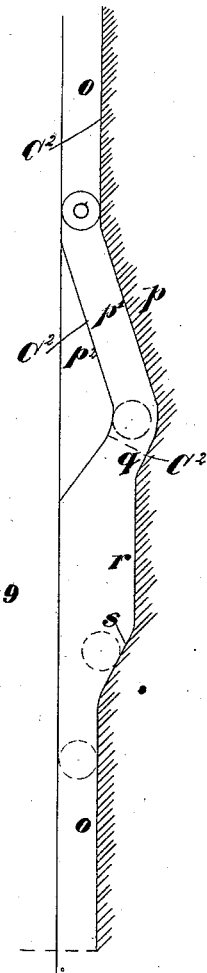
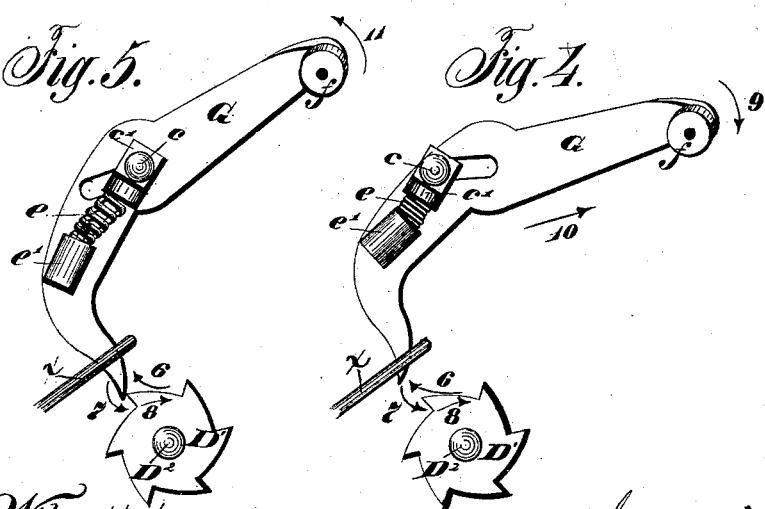
Witnesses:
John B. Kaspare
John F. Steward
Inventor:
Robert. W. Maske.
N. PETERS. Photo-Lithographer. Washington, D. C.

(Model.)  2 Sheets—Sheet 2.
R. W. MASKE.
CORD HOLDER FOR GRAIN BINDERS.
No. 297,144.  Patented Apr. 22, 1884.
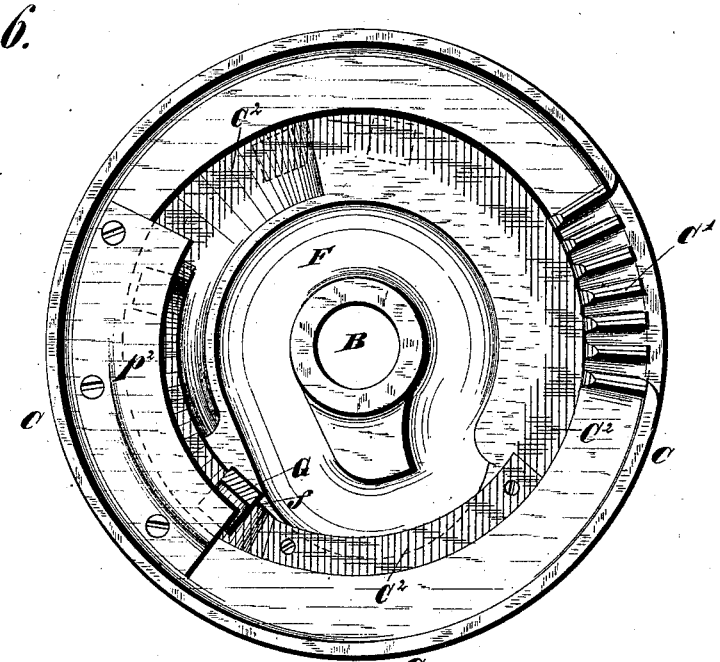
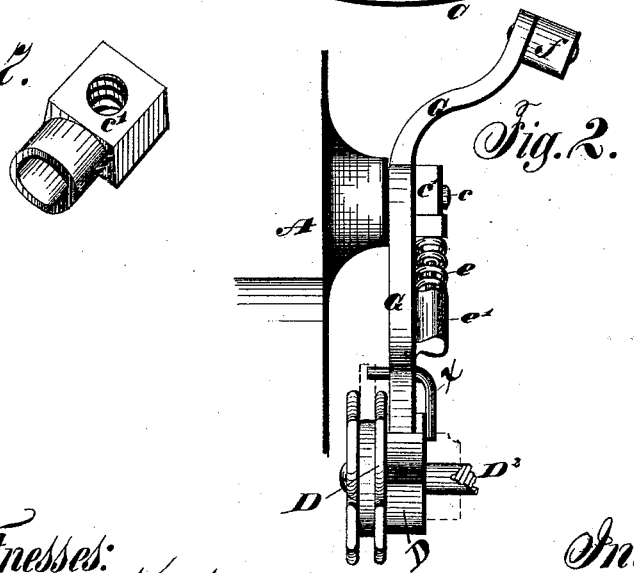
Witnesses:
John B. Kaspare
J. F. Steward
Inventor:
Robert. W. Maske

UNITED STATES PATENT OFFICE.

ROBERT W. MASKE, OF CHICAGO, ILLINOIS, ASSIGNOR TO WILLIAM DEERING, OF SAME PLACE.

CORD-HOLDER FOR GRAIN-BINDERS.

SPECIFICATION forming part of Letters Patent No. 297,144, dated April 22, 1884.

Application filed April 13, 1883. (Model.)

*To all whom it may concern:*

Be it known that I, ROBERT W. MASKE, a citizen of the United States, residing at Chicago, in the county of Cook and State of Illinois, have invented certain new and useful Improvements in Cord - Holders for Grain-Binders, of which the following is a full specification, reference being had to the accompanying drawings, making part of the same.

My invention relates to mechanism for giving motion to the intermittently-rotating cord-holding disks, and its nature will be hereinafter fully set forth.

In the drawings, Figure 1 shows the parts constituting my invention, as well as those associated therewith in place as viewed from beneath the knotter-frame. The gear-wheel for giving movement to the parts is partly broken away to expose some of the essential features. Fig. 2 is a view of the ratcheted holding-disk and the holder-rotating lever as viewed from a position to the left of Fig. 1. Fig. 3 is a representation of the cam for giving motion to the holder-moving lever, as if it were removed from the wheel and unrolled. Figs. 4 and 5 are views designed to show the positions assumed by the lever in relation to the disk-ratchet. Fig. 6 is a view of the knotter and holder-driving wheel as viewed from a position to the left of Fig. 1. Fig. 7 is a perspective view of the pivot-bolt nut, showing the socket upon its side for receiving one end of the spiral spring, for returning the holder-moving lever to its place of rest.

In the drawings, A is the knotter-frame—a casting forming a support for all the working parts, provided with a sleeve, A', fitting a little loosely upon the shaft B, so that the latter may revolve therein, and having a slot, A², through which the needle descends to lay the twine within reach of the knotter.

The knotter-shaft $a$ and its driving-pinion $b$ are shown in Fig. 1, the former revolving in suitable bearings.

C is the gear for giving motion to all the operating parts. It is secured to the shaft B by keying and by the nut B'.

D is the holder, consisting of two disks of the shape shown in Fig. 1, and so placed in relation to each other, as shown in Fig. 2, with a space between them, into which the twine forming the band material is forced by the plate E. Beneath both disks, and as one piece with them, is the ratchet-wheel D', the teeth corresponding in number with the notches of the holding-disk. The holder is rotated intermittently on the pin D² one-sixth of a revolution at each movement, and is held from retrograding by the hooked check-spring D³.

So far as described, and further that the knotter receives its rotation from the driving-gear by means of the toothed segment C', the parts do not differ from many of those in common use, and need not be further described nor their operation referred to.

The means for giving movement to the holder, which device constitutes the subject-matter of my invention, will now be specifically described.

I pivot a lever, G, of the form shown in the various figures, near its middle, to the frame by means of the bolt $c$, the latter taking the nut $c'$, (see Fig. 7,) which has a short cylindrical socket projecting from one side for the reception of one end of the coiled spring $e$, which has its other end in a socket, $e'$, upon the lower face of the lever. The lever G rocks on the pivot-bolt $c$ and the hole which receives the pivot-bolt $c$ is made a slot, whereby the lever is capable of an endwise sliding movement on the said pivot-bolt. An anti-friction roller, $f$, is mounted on a pin at the extremity of the straight end of the lever. This latter treads on a cam-track provided on the wheel C as the latter rotates, by means of which the lever is given its vibrations as well as its endwise movements on the bolt $c$. The return endwise movement of the lever is insured by the spring $e$. The operating-point of the lever is so bent as to reach the ratchet-wheel D' and to engage its teeth. The movement of the point of the pawl is indicated by the arrows numbered 6, 7, and 8 in Figs. 4 and 5. As seen in Fig. 6, the cam-track C² is concentric with the wheel C, but has its face undulating. so that the roller $f$ shall be moved in a direction substantially parallel with the line of the shaft carrying the wheel. The planes and inclines of the cam-track are indicated in Fig. 6 by the shadings and by the letters corresponding in it and Fig. 3, where an edge view of the cam is shown as if unrolled.

The main part $o$ of the track occupies about two-thirds of the extent of the whole cam. On this part the roller $f$ treads while the lever is at rest. (See Fig. 1.) The incline $p$ is opposed by the part $p^2$, so shaped as to form a channel, $p'$, in which the roller $f$ can travel. At the ending of the lowermost part of the channel is the bluff $q$, which operates to raise the lever somewhat, then follows a straight track, $r$, then another rise, $s$, terminating in the main track $o$. The roller during the greater part of the rotation of the wheel travels in the portion $o$ of the cam-track; but while it is passing through the portion $p'$ the roller end of the lever is moved in the direction indicated by the arrow 9 in Fig. 4 for a little distance. In the endwise movement of the lever the spring $e$ has been compressed and the parts are in the position shown in Fig. 4; but as soon as the roller has been passed by the crown of part $p^2$ the said spring is permitted to expand and carry the lever to the position shown in Fig. 5. The incline $q$ in part assists the spring to perform its office. With the lever in the position last mentioned, with its point engaging a tooth of the ratchet-wheel $D'$, the roller travels for an instant upon the straight part $r$ of the cam until the rise $s$ reaches it, when the lever is given a heave in the direction indicated by arrow 11 in Fig. 5 and the point carried in the direction of the arrow 8. The ratchet-wheel tooth engaged by the pawl is of course carried with it, and hence the holding-disks are given a partial rotation. It is plain, then, that for every rotation of the wheel C the movements just described are repeated.

The deep groove F shown in the cam is used for giving movement to the twine-cutting knife. (Not shown.)

Part of the track $o$ and the part $p^2$ are shown as separate pieces. They may be cast in place in making.

$x$ is a piece of stout wire, projecting from the frame A in such a manner that the point of the pawl or lever will come in contact with it and prevent it from falling out of the ratchet-teeth should the parts become loose.

What I claim is—

1. The combination of the ratchet-wheel, the lever having a longitudinal and vibratory movement, and adapted to engage the teeth of the said ratchet-wheel to produce intermittent rotation thereof, and means for moving the said lever, substantially as described.

2. The combination of the ratchet-wheel, the lever having a longitudinal and vibratory movement, and adapted to engage the teeth of the said ratchet-wheel to produce intermittent rotation thereof, and the wheel C, having the cam-track adapted to produce the described vibratory and longitudinal movements of the said lever, substantially as described.

3. The vibratory and endwise-movable lever G, combined with the cam-wheel C, for producing the described movements of the lever, substantially as described.

4. The combination of the vibratory and endwise-movable lever, the cam-wheel C, for giving said lever the described movements to move the cord-holding ratchet-wheel, and the spring $e$, for returning the said lever to the position for re-engagement with the ratchet-wheel, substantially as described.

ROBERT W. MASKE.

Witnesses:
JOHN F. STEWARD,
JOHN B. KASPARI.